United States Patent
Czarnecki (10) Patent No.: US 10,487,955 B2
(45) Date of Patent: Nov. 26, 2019

(54) CHECK VALVE

(71) Applicant: Hamilton Sundstrand Corporation, Charlotte, NC (US)

(72) Inventor: Pawel Czarnecki, Świdnica (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 148 days.

(21) Appl. No.: 15/378,160

(22) Filed: Dec. 14, 2016

(65) Prior Publication Data
US 2017/0167618 A1   Jun. 15, 2017

(30) Foreign Application Priority Data

Dec. 14, 2015   (EP) ..................................... 15461584

(51) Int. Cl.
*F16K 15/03*   (2006.01)

(52) U.S. Cl.
CPC ...................... *F16K 15/035* (2013.01); *F16K 15/033* (2013.01); *Y10T 137/7839* (2015.04)

(58) Field of Classification Search
CPC   Y10T 137/7839; F16K 15/035; F16K 15/033
See application file for complete search history.

(56) References Cited

U.S. PATENT DOCUMENTS

| | | |
|---|---|---|
| 3,122,156 A | 2/1964 | Kersh |
| 3,938,197 A | 2/1976 | Milo |
| 4,289,166 A | 9/1981 | Haines |
| 4,290,615 A | 9/1981 | Etcheverry |
| 4,351,358 A * | 9/1982 | Ogle, Jr. ............... F16K 15/035 137/512.1 |
| 4,871,514 A | 10/1989 | Ross |
| 5,456,294 A * | 10/1995 | Tsao ...................... B65D 41/32 141/1 |
| 5,628,792 A * | 5/1997 | Lentell .................. A61F 2/2403 623/2.12 |
| 6,035,896 A | 3/2000 | Liardet |
| 9,909,375 B2 * | 3/2018 | Church .................. E21B 34/08 |

(Continued)

FOREIGN PATENT DOCUMENTS

| EP | 3106721 A1 | 12/2016 |
| GB | 26783AD1909 A | 9/1910 |
| GB | 190926783 A | 9/2010 |

OTHER PUBLICATIONS

European Search Report for Application No. 15461584.3-1751; dated Jun. 8, 2016; 9 pages.

(Continued)

*Primary Examiner* — Marina A Tietjen
*Assistant Examiner* — Frederick D Soski
(74) *Attorney, Agent, or Firm* — Cantor Colburn LLP (57) ABSTRACT

A check valve comprises a valve housing defining an opening and a plurality of flapper elements each having a proximal end and a distal end, the flapper elements being pivotally mounted to the valve housing at their proximal ends for pivotal movement between a closed position, in which they block the flow of fluid through the opening and an open position in which they permit the flow of fluid through the opening. Each flapper element is generally triangular or trapezoidal in shape such that the flapper elements create a generally conical or frustoconical shape when in the closed position.

12 Claims, 11 Drawing Sheets

(56) References Cited

U.S. PATENT DOCUMENTS

2011/0056569 A1    3/2011  Chambo et al.
2015/0308681 A1*  10/2015  Martin .................. F16K 15/035
                                                        431/5

OTHER PUBLICATIONS

EP Communication pursuant to Article 94(3) EPC, for application No. 15461584.36-1015, dated Aug. 10, 2018 5 Pages.

* cited by examiner

CHECK VALVE

FOREIGN PRIORITY

This application claims priority to European Patent Application No. 15461584.3 filed Dec. 14, 2015, the entire contents of which is incorporated herein by reference.

TECHNICAL FIELD

The present disclosure relates to a check valve.

BACKGROUND

It is known to use check valves to allow fluid flow in one direction, and to prevent flow in the opposite direction. Check valves are widely used in a wide variety of applications, for example in air conditioning systems, for example in aircraft air conditioning systems. Many types of check valves are known. Some check valves include hinged flappers that open in the direction of fluid flow. In such valves, when a fluid pressure exceeds a predetermined valve "cracking pressure", the flappers of the valve open. Likewise, if significant pressure drops in the upstream fluid are experienced (such that there is a negative pressure differential across the valve), the flapper elements close, preventing flow reversal. Such check valves typically include a pair of flapper elements and frequently employ stop pins or bumpers which restrict movement of the flapper past a predetermined maximum opening angle.

The flapper elements of such prior art flapper valves typically move through large angles, before impacting the stop pin or bumper when the maximum opening angle is reached. Moreover each flapper is relatively large (typically being semi-circular in shape). The impact of the flappers against the stop pin or bumper may therefore be relatively large. Also, since the flappers are relatively large (and therefore relatively massive), the reaction time of the valve may be quite high.

The present disclosure relates to a check valve which a modified flapper arrangement.

SUMMARY

According to the present disclosure, there is provided a check valve comprising a valve housing defining an opening and a plurality of flapper elements. Each flapper element has a proximal end and a distal end, and is mounted to the valve housing at its proximal end for pivotal movement between a closed position, in which they block the flow of fluid through the opening and an open position in which they permit the flow of fluid through the opening. Each flapper element is generally triangular or trapezoidal in shape such that the flapper elements create a generally conical or frustoconical shape when in the closed position.

Adjacent edge portions of adjacent flapper elements may contact each other to effect a seal therebetween when the flapper elements are in the closed position.

The proximal ends of the flapper elements may engage the valve housing to effect a seal therebetween when in the closed position.

In certain embodiments the flapper elements may be generally triangular in shape and the distal ends of the adjacent edge portions of adjacent flapper elements contact each other when in the closed position. In other embodiments, the flapper elements may be generally trapezoidal in shape, the check valve further comprising a plug element for mounting to the valve housing and spaced from the opening, the plug element engaging the distal ends of the flapper elements to close an opening formed at the distal ends of the flapper elements.

The plug element may be a disc.

The plug element may be mounted axially forward of the valve housing by a plurality of circumferentially spaced supports.

In embodiments, an edge portion of one flapper element overlaps an edge portion of an adjacent flapper element when in the closed position.

The overlap between the adjacent flapper elements may be such as to draw the flapper elements towards the closed position due to gravity.

In certain embodiments, one or more biasing elements may be provided for biasing the flapper elements towards the closed position.

The biasing elements may comprise one or more springs, for example torsion springs.

The proximal end of each flapper element may further comprise a bumper element for engagement with the valve housing when in the open position.

The respective bumper elements may be configured to receive a hinge pin which pivotally mounts the flapper elements to the valve housing.

The valve housing may be a generally annular member.

BRIEF DESCRIPTION OF THE DRAWINGS

Some exemplary embodiments and features of the present disclosure will now be described by way of example only, and with reference to the following drawings in which.

DETAILED DESCRIPTION

With reference to FIGS. 1A to 2B, a flapper check valve 10 is illustrated. Check valve 10 is configured to be mounted in, for example, a duct in order to prevent reverse flow of a fluid through the duct. As shown, the check valve 10 comprises a generally annular valve housing 2, defining an opening 16 therethrough. The valve 10 further comprises a plurality of adjacent flapper elements 4 which are pivotally mounted to the valve housing 2. The flapper elements 4 are configured to move between an open position (shown in FIG. 1A and 1B) and a closed position (shown in FIGS. 2A and 2B), permitting or preventing flow through the opening 16 respectively.

Figure 2A:
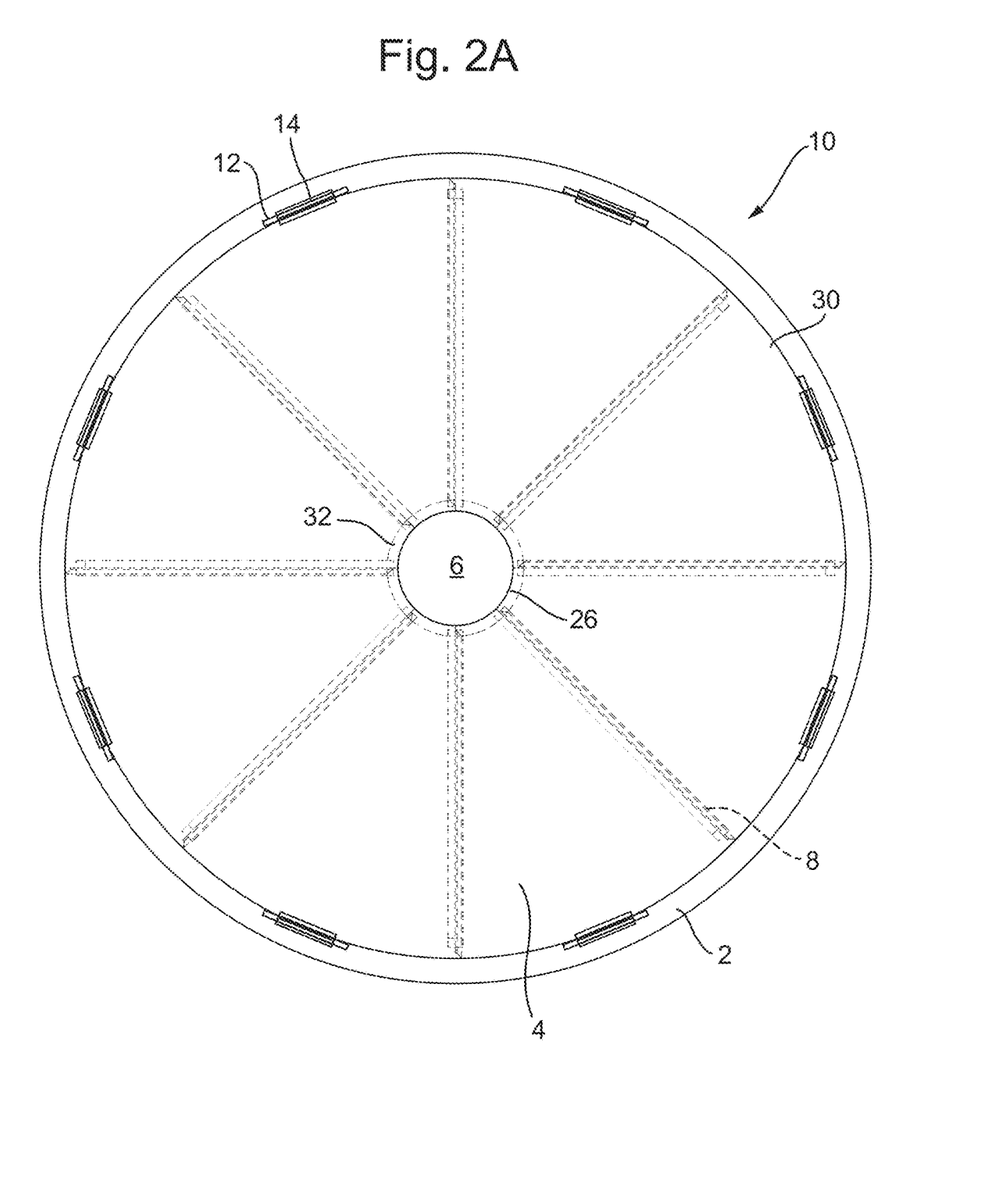
FIG. 2A shows a front view of the check valve of FIG. 1A in a fully closed position.
Figure 2B:
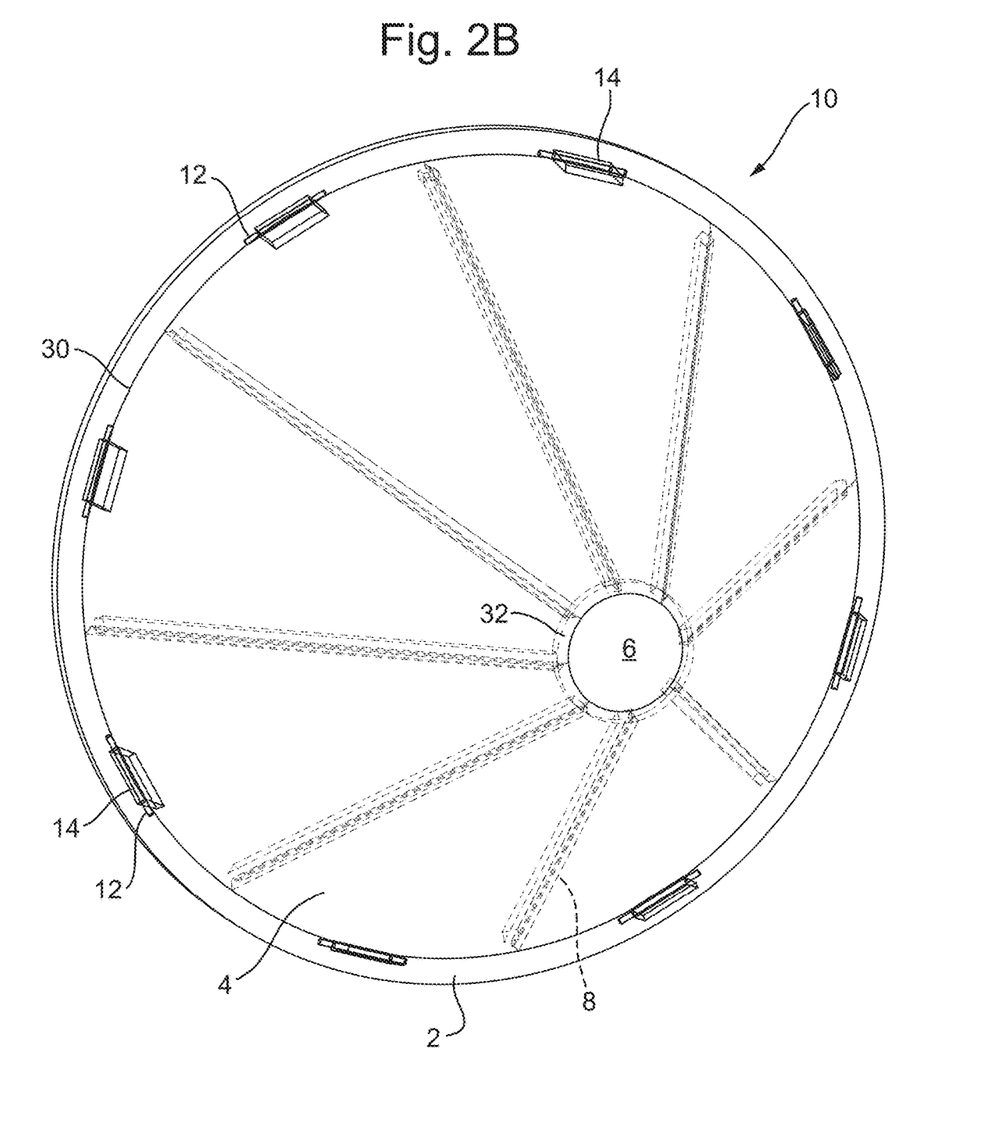
FIG. 2B shows a perspective view of the check valve of FIG. 2A.

As shown in FIG. 2B, in the closed position, the flapper elements 4 of the valve 10 create a generally frustoconical shape. It should be understood that a generally frustoconical shape refers to a cone whose tip has been truncated by a plane generally parallel to its base. It will be appreciated that other shaped check valves may fall within the scope of the invention, as will be discussed further below.

Each flapper element 4 includes an inner surface 20, an outer surface 22, a curved proximal end 30, a curved distal end 32 and side edges 34, 35 extending between the proximal end 30 and the distal end 32. In the embodiment shown, the flapper elements 4 are generally trapezoidal in shape. It should be understood that generally trapezoidal in this context refers to a four sided shape, with a proximal end, a distal end, and two sides converging toward the distal end from the proximal end. The proximal end 30 includes a proximal edge 31; the distal end 32 includes a distal edge 33.

As shown, the valve 10 further comprises a plug element 6, mounted axially forward of the valve housing 2. The plug element 6 is mounted to the valve housing 2 by means of a plurality of circumferentially spaced supports 8. In the embodiment shown, the plug element 6 is in the form of a disc. However, it will be appreciated that a plug element 6 of any suitable shape may be used. The plug element 6 comprises a circumferential edge portion 26 which is configured to engage the distal edge 33 of the flapper elements 4 when the valve 10 is in the closed position, to effect a seal therebetween. As previously discussed, when in the closed position, the generally trapezoidal flapper elements 4 and plug element 6 form a check valve 10 with a generally frustoconical shape.

Each flapper element 4 further includes a bumper element 14 at its proximal end 30. The bumper elements 14 are configured to prevent the flapper elements 4 from opening beyond a predetermined maximum opening angle and will contact the valve housing 2 when the respective flapper element 4 is in its fully opened position. The maximum opening angle may be between 30 and 35 degrees, for example, but it will be appreciated that that angle may vary depending upon the valve design requirements. In an alternative embodiment, the bumper elements 14 may be mounted to, or integrally formed with, the valve housing 2. In either arrangement, however, the reduced angle of travel of each flapper element 4 and its relatively small mass (due to its trapezoidal shape) may lead to reduced impact forces acting on the flapper elements 4 and the valve housing 2, reducing or mitigating the possibility of impact damage occurring thereto.

The check valve 10 further comprises a plurality of hinge pins 12 which are mounted to the valve housing 2 by any suitable means. The flapper elements 4 are pivotally mounted to the valve housing 2 at their proximal ends 30 by the respective hinge pins 12. Each hinge pin 12 is received within a bore formed in a respective bumper element 14. It will be seen that in the closed position, one of said side edges 34 of one flapper element 4 proximal the valve housing 2 overlaps with the adjacent side edge 35 of an adjacent flapper element 4. In this embodiment the side edges 34, 35 have a generally complementary chamfered profile such that a face to face seal is formed between the side edges 34, 35.

In fact, there may be a small degree of overlap between the side edges 34, 35 when the valve 2 is open, for reasons to be discussed further below.

Moreover, the proximal end 30 of the flapper element 4 will have a complementary profile to the valve housing 2 such that a seal is formed therebetween when the flapper elements 4 are in the closed position. Again, for example, the profiles may be chamfered.

One or more biasing elements, for example one or more springs, may be provided to bias the flapper elements 4 towards their closed position. In one embodiment, the biasing element may comprise a torsion spring mounted around the hinge pin 12 between the valve housing 2 and the flapper element 4.

Figure 1A:
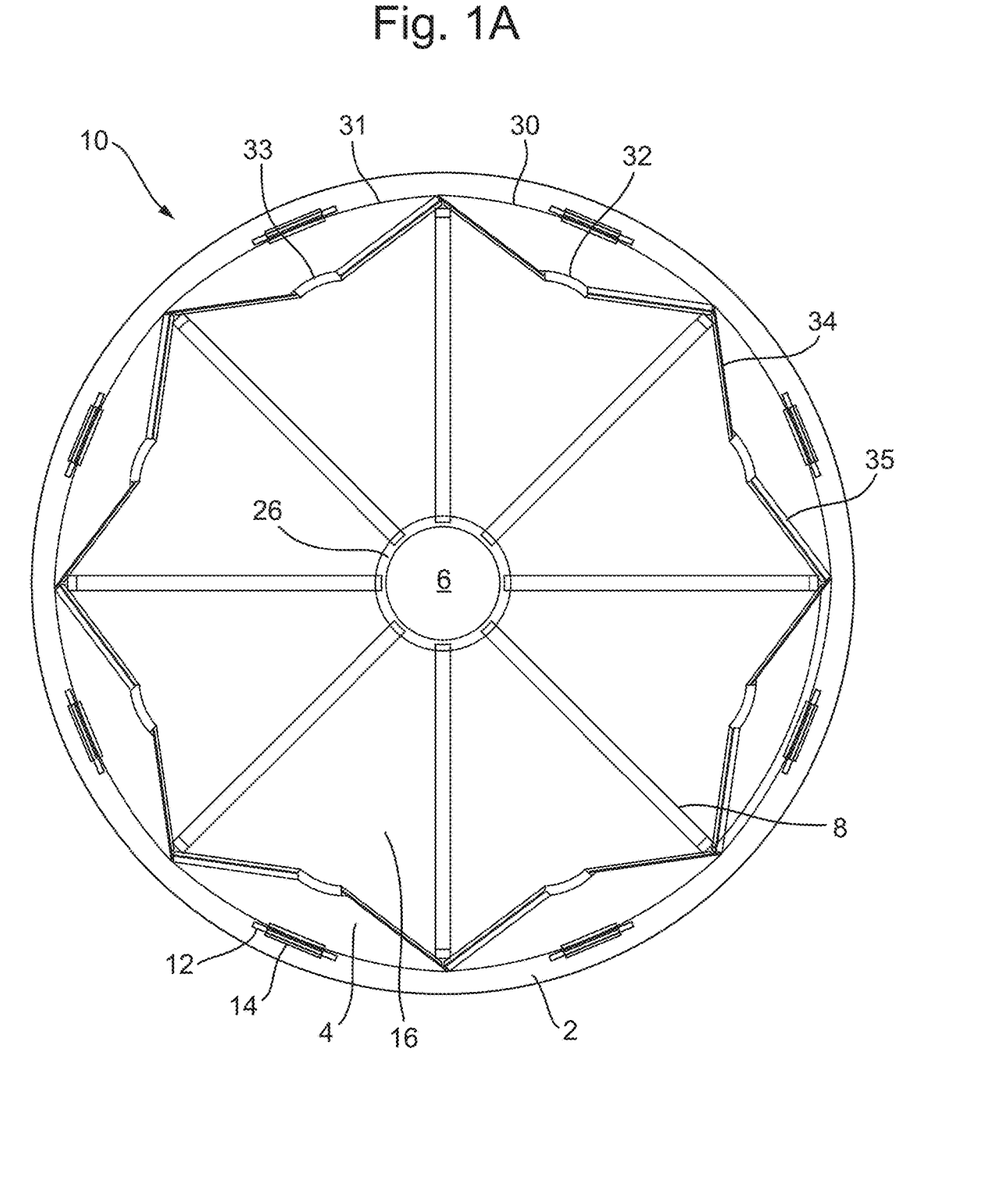
FIG. 1A shows a front view of a first embodiment of check valve in accordance with this disclosure, in a fully open position.
Figure 1B:
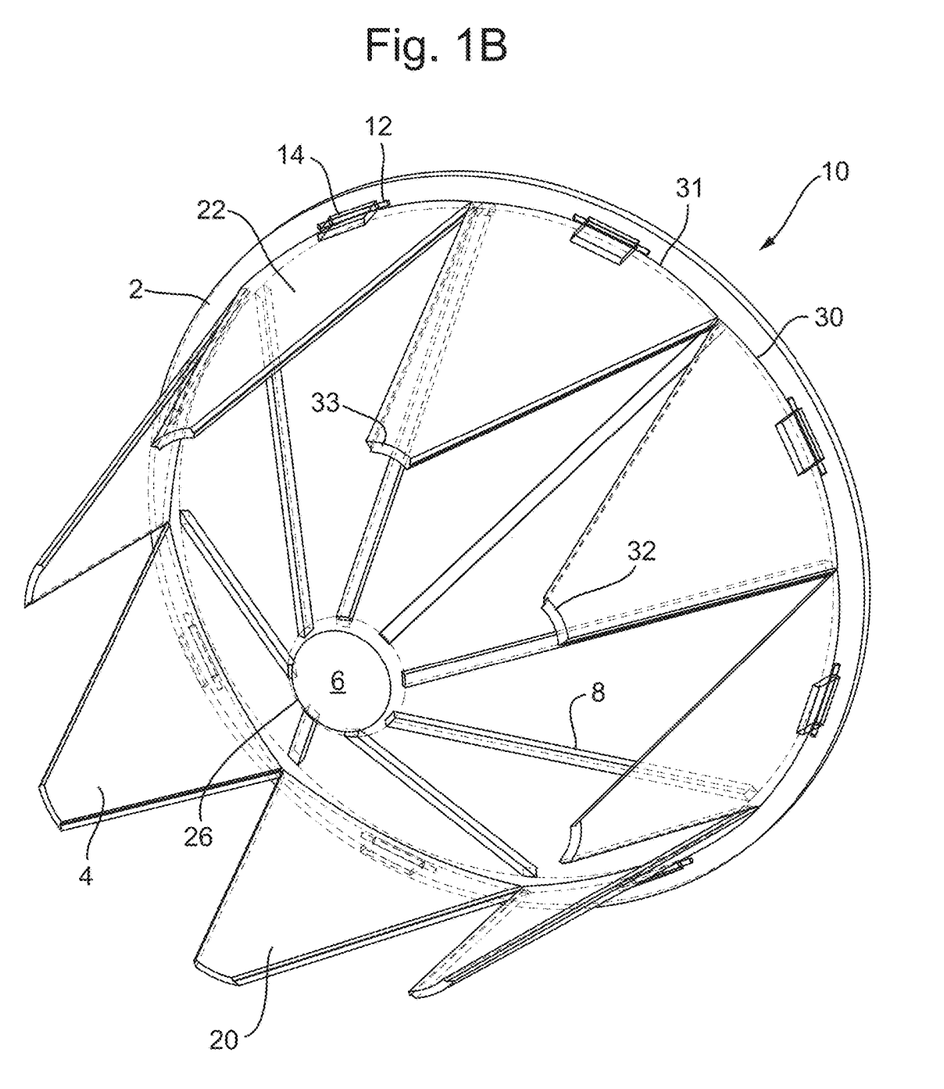
FIG. 1B shows a perspective view of the check valve of FIG. 1A.

In operation, each of the adjacent flapper elements 4 is configured to move pivotally about the hinge pin 12 between a closed position as shown in FIGS. 2A and 2B, and a fully open position as shown in FIGS. 1A and 1B (and vice versa). As such, when the flapper elements 4 move into the fully open position, the bumper elements 14 engage with the valve housing 2, preventing pivotal movement of each of the flapper elements 4 beyond this angle. The maximum angle may, for example, be determined or chosen so as to facilitate optimal forces upon the flapper elements 4 and/or to permit an optimal fluid flow through the valve 10.

The closed position of the valve 10 is maintained when the fluid pressure being applied to the inner surfaces 20 of each of the flapper elements 4 is less than that of the predetermined cracking pressure and/or any biasing forces that may be acting upon the flapper elements 4. One skilled in the art will understand the "cracking pressure" to be the minimum upstream fluid pressure that is required for the valve to operate (i.e. the minimum pressure required to cause the flapper elements 4 to begin to move into the open position). Once the upstream fluid pressure equals that of the predetermined valve cracking pressure and/or any biasing forces acting on the flapper elements 4, the flapper elements 4 will begin to open, with increased pressure moving the flapper elements 4 move into their fully open positions in which the bumper elements 14 contact the valve housing 2. Each flapper element 4 is then held in this position by the upstream fluid pressure.

In the event that an upstream fluid pressure drop is experienced, such that the upstream fluid pressure does not equal or exceed the cracking pressure and/or the biasing forces acting on the flapper elements 4, or if the downstream fluid pressure exceeds the upstream fluid pressure, the flapper elements 4 will be urged into the closed position. As when moving into the open position, when moving into the closed position, each of the flapper elements 4 pivots about the hinge pin 12, albeit in the opposite direction.

In the embodiment shown, the flapper elements 4 may return to the closed position as a result of the gravitational forces acting on the upper flapper elements 4. This is due to the overlap of the side edges 34, 35 of the adjacent flapper elements. As a result of the overlapping side edges of each element, the downward movement of the upper flapper elements 4 results in the remaining elements 4 to also be drawn into the closed position. As was discussed earlier, any suitable level of overlap between adjacent flapper elements 4 may be chosen, depending upon valve performance or system requirements, for example.

In certain embodiments, as described above, the flapper elements may be provided alternatively or additionally with biasing springs to return the flapper elements to the closed position.

Figure 3A:
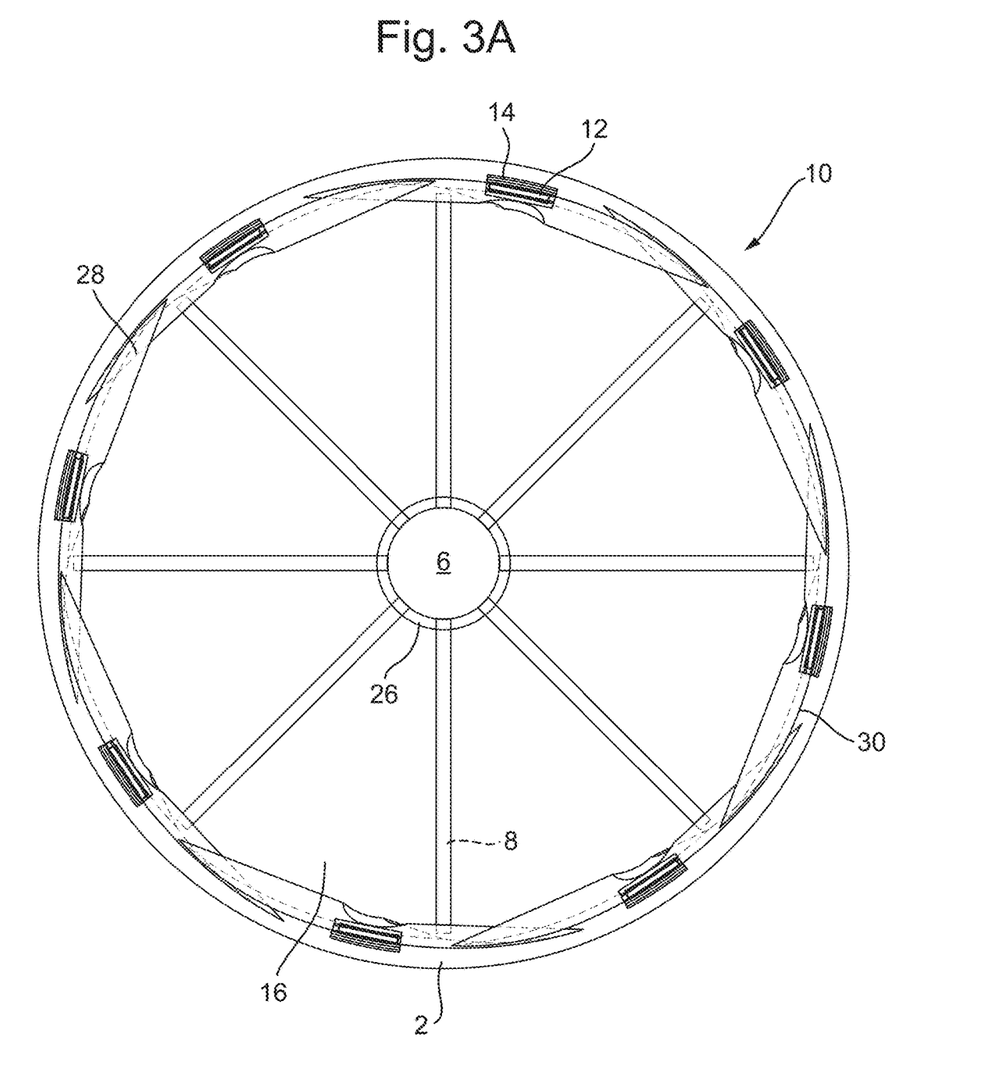
FIG. 3A shows front view of a second embodiment of check valve in accordance with this disclosure, in a fully open position.
Figure 3B:
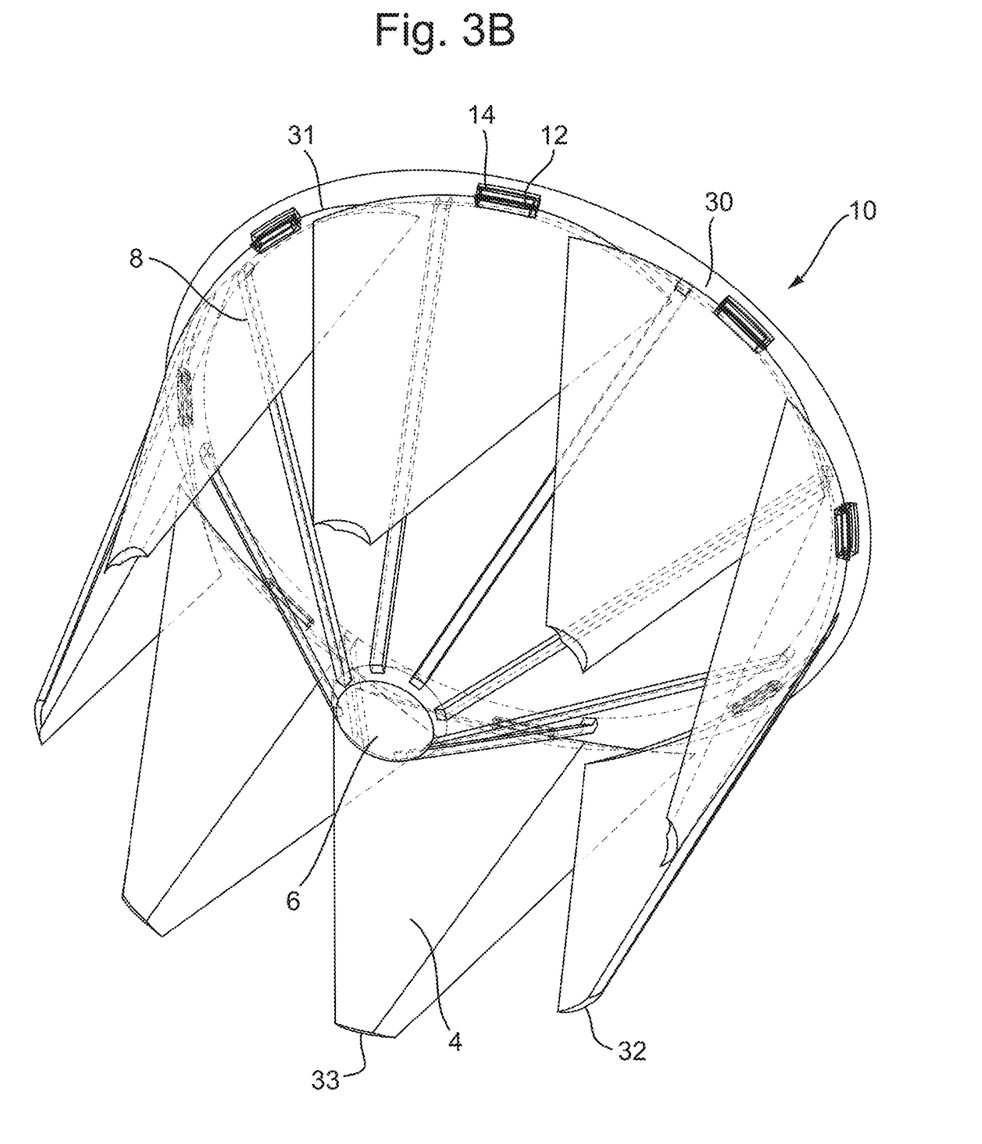
FIG. 3B shows a perspective view of the check valve of FIG. 3A.
Figure 3C:
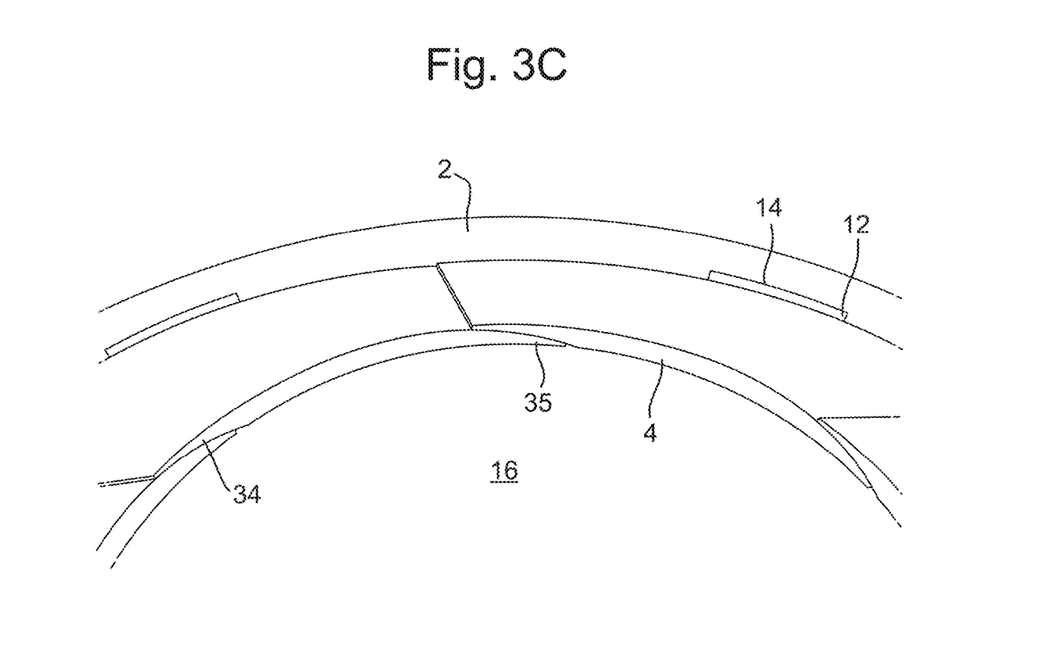
FIG. 3C shows a detail of the check valve of FIGS. 3A and 3B.
Figure 4A:
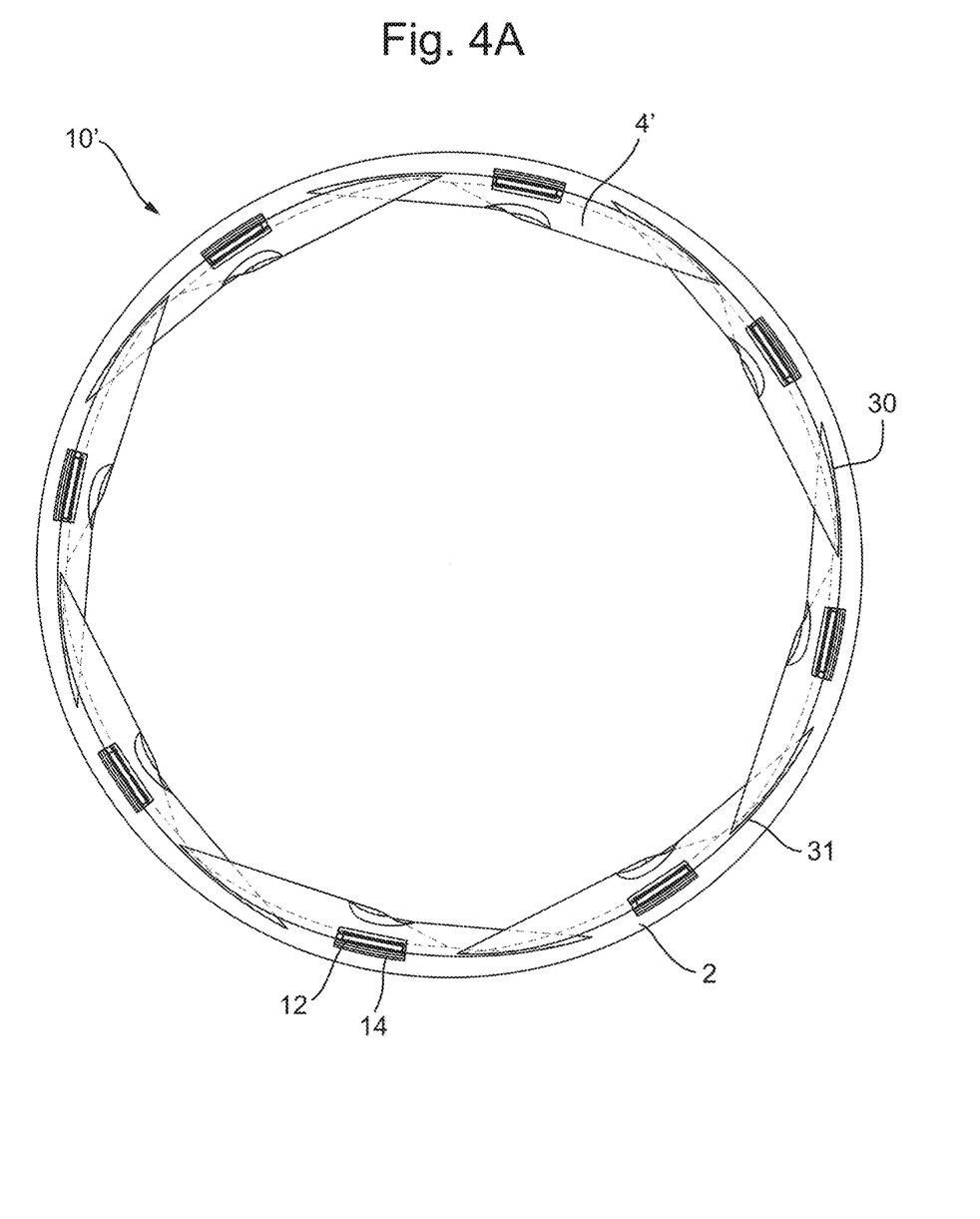
FIG. 4A shows a front view of a third embodiment of check valve in accordance with this disclosure, in a fully open position.
Figure 4B:
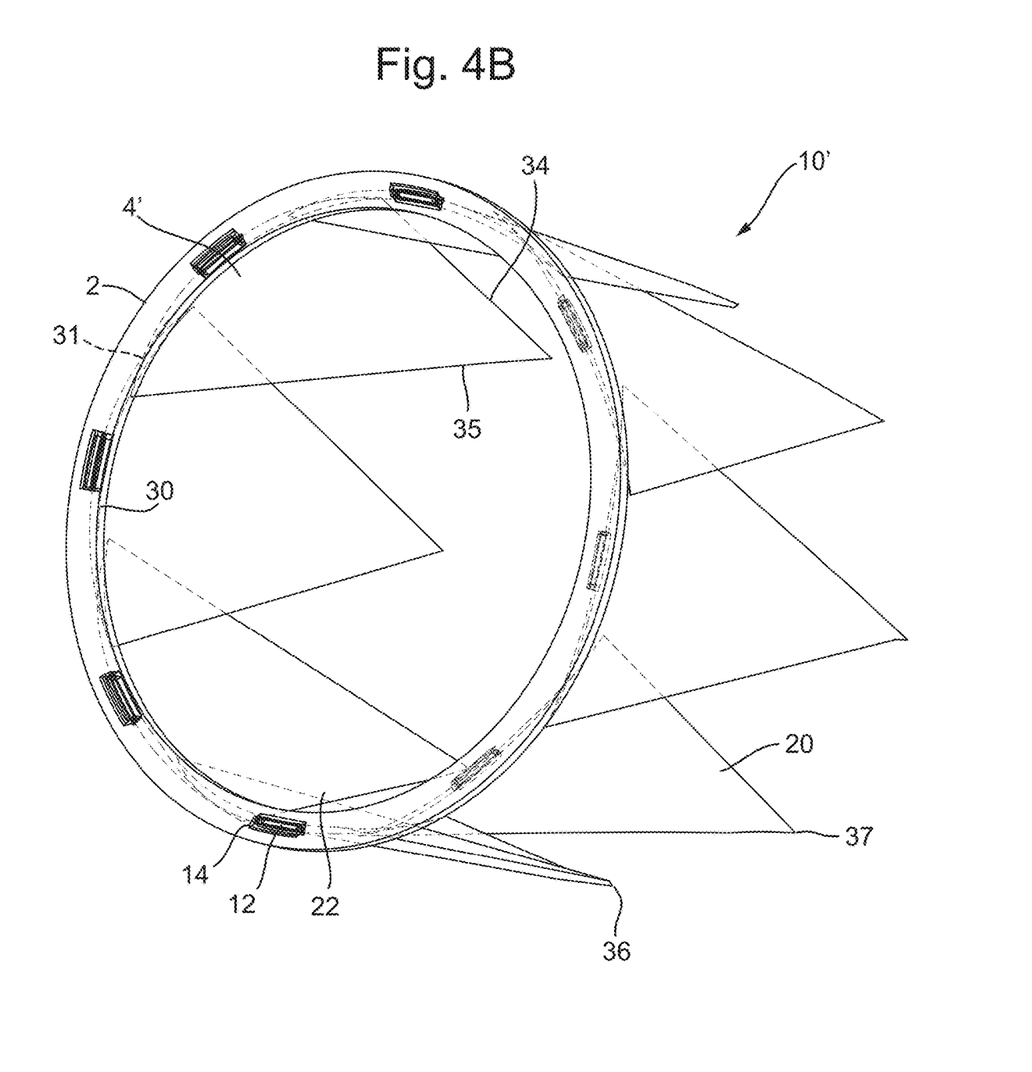
FIG. 4B shows a perspective view of the check valve of FIG. 4A.

It will be understood that the flapper elements 4 may be arranged and shaped differently from the arrangement shown above. FIGS. 3A to 3C show such an arrangement.

In this embodiment, the degree of overlap between adjacent flapper elements 4 is greater than in the first embodiment. This may provide a better seal between flapper elements 4 and facilitate movement of the flapper elements 4 to their closed position.

With reference to FIGS. 4A to 5B, a further embodiment of the foregoing check valve 10' will be described. For simplicity, the features of the system that are consistent with those of the foregoing embodiment have been referenced with consistent numerals. Features specific to this embodiment have been denoted with prime ("'") notation.

Figure 5A:
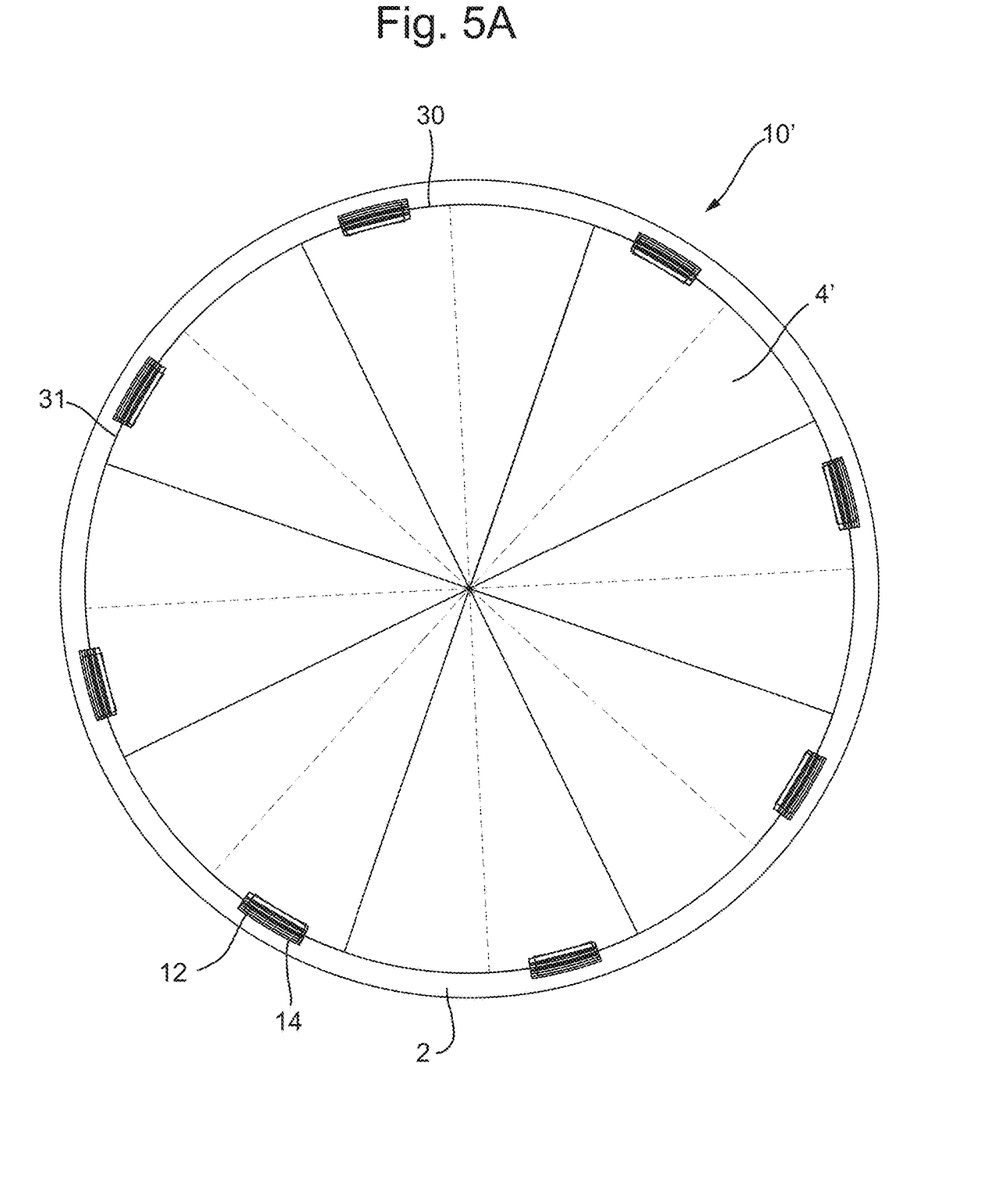
FIG. 5A shows the check valve of FIG. 4A in a fully closed position.
Figure 5B:
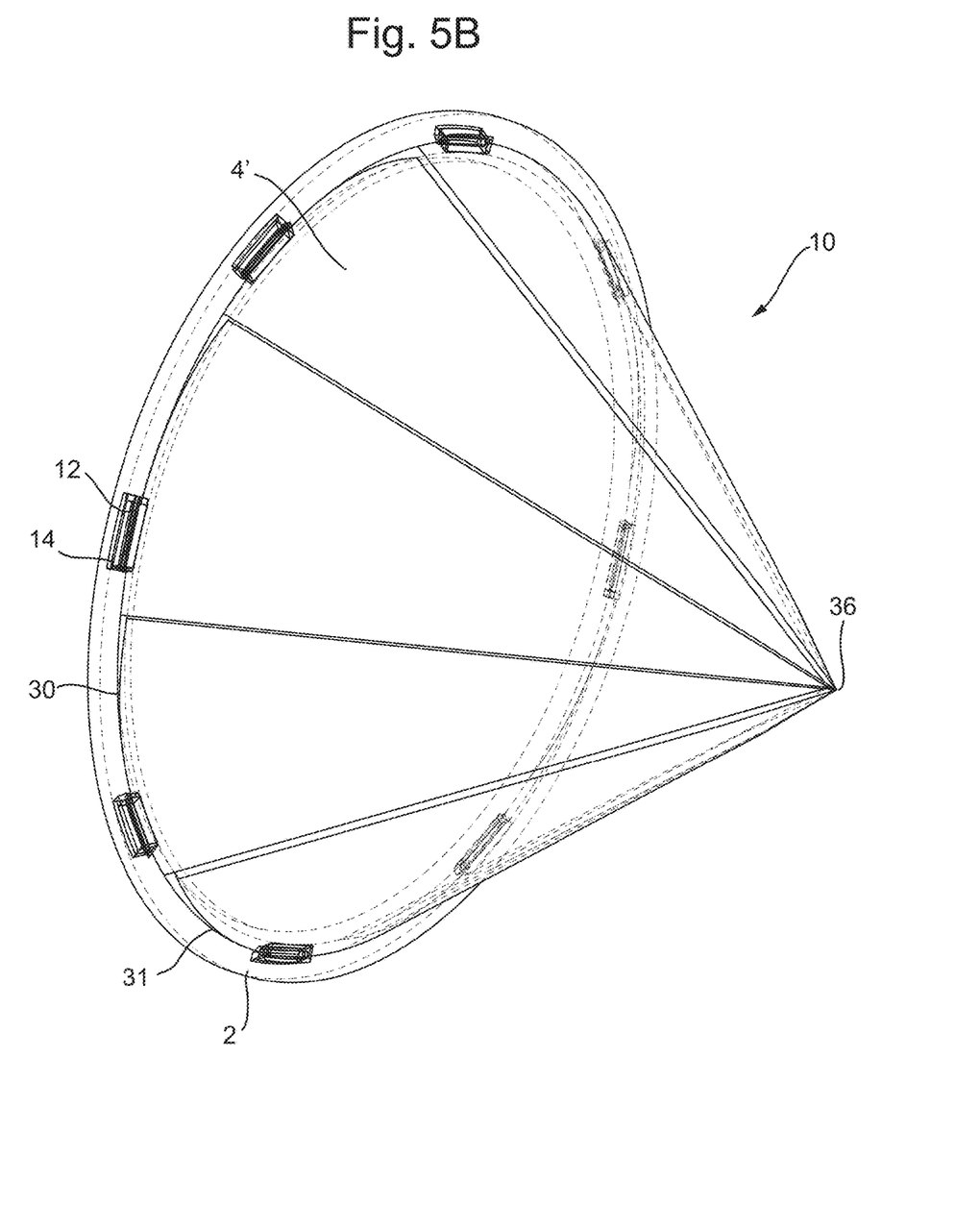
FIG. 5B shows a perspective view of the check valve of FIG. 5A.

In this embodiment, as shown in FIG. 5B, when in the closed position, the flapper elements 4' create a generally conical shape. Each flapper element 4' includes an inner surface 20, an outer surface 22, a curved proximal end 30, a distal end 36 and side edges 34, 35.

In this embodiment, however, the flapper elements 4' are generally triangular in shape. It should be understood that generally triangular in this context refers to a three sided shape, with a proximal end, a distal end, and two sides converging toward the distal end, forming an apex at that end. The proximal end 30 includes a proximal edge 31; the distal apex end 36 includes a distal edge 37. In this embodiment, when in the closed position, the side edges 34, 35 and distal edges 37 of each of the respective flapper elements 4' are configured to engage with one another, to effect a seal therebetween. This avoids the need for a plug element 6 and supports 8. Again, the proximal end 30 of the flapper elements will have a complementary profile to the valve housing 2, such that a seal is also formed therebetween when in the closed position. As previously discussed, when in the closed position, the generally triangular flapper elements 4' form a check valve 10' with a generally conical shape.

Although the figures and the accompanying description describe particular embodiments and examples, it is to be understood that the scope of this disclosure is not to be limited to such specific embodiments, and is, instead, to be determined by the following claims.

The invention claimed is:

1. A check valve comprising:
a valve housing defining an opening; and
a plurality of flapper elements each having a proximal end and a distal end, the flapper elements being pivotally mounted to the valve housing at their proximal ends for pivotal movement between a closed position, in which they block the flow of fluid through the opening and an open position in which they permit the flow of fluid through the opening;
wherein each flapper element is rigid and is generally triangular or trapezoidal in shape having a distal end, a proximal end, a first straight side edge extending from the distal end to the proximal end and an opposed second straight side edge extending from the distal end to the proximal end such that the flapper elements create a generally conical or frustoconical shape when in the closed position; wherein the first side edge of one flapper element overlaps the second side edge of an adjacent flapper element when in the closed position, the overlap between the adjacent flapper elements being such as to draw the flapper elements towards the closed position due to gravity.

2. The check valve of claim 1, wherein the proximal ends of the flapper elements engage the valve housing to effect a seal therebetween when in the closed position.

3. The check valve of claim 1, wherein the flapper elements are generally triangular in shape and wherein the distal ends of adjacent edge portions of adjacent flapper elements contact each other when in the closed position.

4. The check valve of claim 1, wherein the flapper elements are generally trapezoidal in shape, the check valve further comprising a plug element mounted to the valve housing and spaced from the opening, the plug element engaging the distal ends of the flapper elements to close an opening formed at the distal ends of the flapper elements.

5. The check valve of claim 4, wherein the plug element is a disc.

6. The check valve of claim 4, wherein the plug element is mounted axially forward of the valve housing by a plurality of circumferentially spaced supports.

7. The check valve of claim 1 further comprising: one or more biasing elements for biasing the flapper elements towards the closed position.

8. The check valve of claim 7, wherein the biasing elements comprise one or more springs.

9. The check valve of claim 1, wherein the proximal end of each flapper element further comprises a bumper element for engagement with the valve housing when in the open position.

10. The check valve of claim 9, wherein the respective bumper elements are configured to receive a hinge pin, wherein said hinge pin pivotally mounts the flapper elements to the valve housing.

11. The check valve of claim 1, wherein the valve housing is a generally annular member.

12. A check valve comprising:
a valve housing defining an opening; and
a plurality of flapper elements each having a proximal end and a distal end, the flapper elements being pivotally mounted to the valve housing at their proximal ends for pivotal movement between a closed position, in which they block the flow of fluid through the opening and an open position in which they permit the flow of fluid through the opening;
wherein each flapper element is rigid and is generally triangular or trapezoidal in shape, having a distal end, a proximal end, such that the flapper elements create a generally conical or frustoconical shape when in the closed position; wherein an edge portion of one flapper element overlaps an edge portion of an adjacent flapper element when in the closed position, the overlap between the adjacent flapper elements being such as to draw the flapper elements towards the closed position due to gravity, and wherein opposed overlapping surfaces of the overlapping edge portions are curved to provide a curved sealing interface between the flapper elements.

* * * * *